United States Patent [19]

Turecek

[11] 4,022,242

[45] May 10, 1977

[54] SHOWER CONTROL VALVE ASSEMBLY

[75] Inventor: Kvetoslav Turecek, Brampton, Canada

[73] Assignee: Danfoss A/S, Nordborg, Denmark

[22] Filed: Feb. 26, 1976

[21] Appl. No.: 661,701

[52] U.S. Cl. ............................ 137/270; 137/100; 137/454.6; 137/625.41; 251/248

[51] Int. Cl.² ................................... F16K 11/02

[58] Field of Search ............... 137/270, 360, 454.6, 137/625.41; 251/248

[56] References Cited

UNITED STATES PATENTS

| 3,674,048 | 7/1972 | Manoogian | 137/270 |
| 3,921,659 | 11/1975 | Rudewick | 137/454.6 X |

*Primary Examiner*—Robert G. Nilson

[57] ABSTRACT

The invention relates to a shower control valve assembly having the feature of a casing with optionally reversible hot and cold inlets on opposite sides thereof. A replaceable cartridge is insertable into the casing. The cartridge has a mixing valve disk rotatably mounted therein which has first and second indexed starting positions displaced 180 degrees from each other to facilitate th optional choosing of which of the two casing inlets is to be connected to the hot water supply pipe and which is to be connected to the cold water supply pipe. The disk has first and second ports cooperable with two internal valve openings in a manner such that when the disk starts from one of its two indexed positions which corresponds to a particular one of the valve openings being connected to the hot water supply, the disk functions sequentially to draw (1) cold (2) mixed temperature and (3) hot water from the two internal valve openings and route it to the casing discharge outlet. A pinion gear arrangement is provided which operates with a 2 to 1 gear ratio between control knob and the mixing valve disk.

4 Claims, 13 Drawing Figures

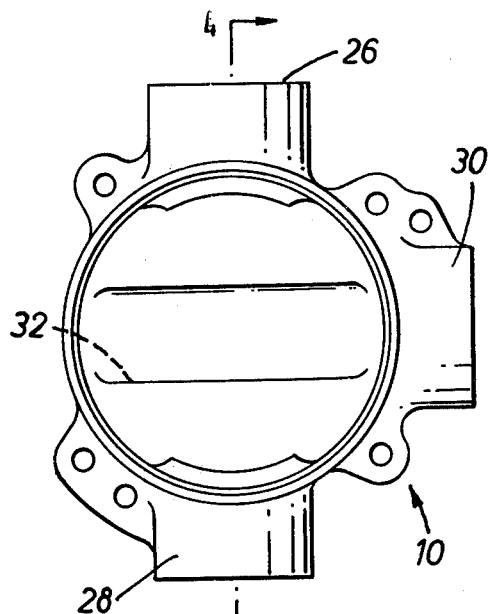
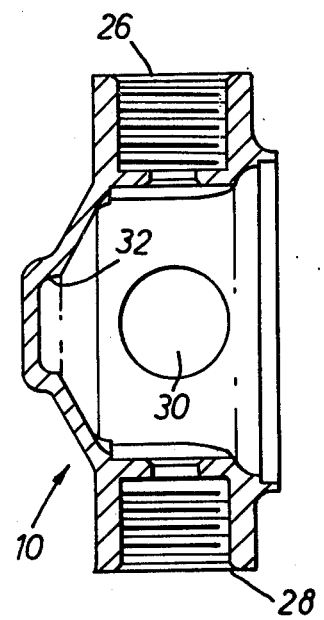
FIG. 3      FIG. 4
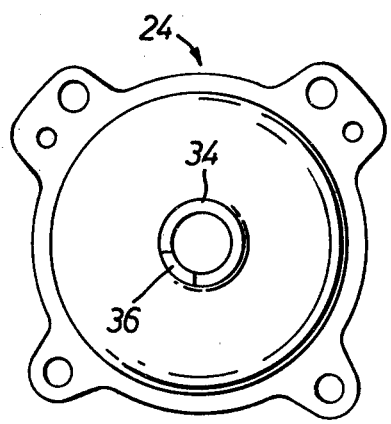
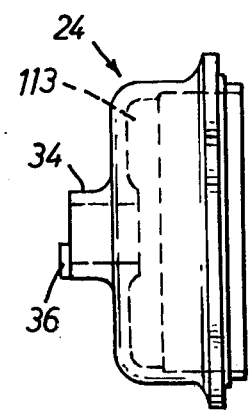
FIG. 5      FIG. 6

SHOWER CONTROL VALVE ASSEMBLY

The invention relates to a new and improved shower control valve assembly.

In the construction of all kinds of residential and commercial buildings it is common practice to have back-to-back bathrooms wherein the hot and cold water supply pipes service shower units on opposite sides of the wall. Prior art shower control valves normally have the cold water inlet on the right and the hot water inlet on the left. As the two supply pipes in the wall are normally side-by-side, it is necessary to provide an awkward cross over arrangement for one of the shower units.

The present invention is directed to providing a new and improved shower control valve assembly comprising a casing having two inlets and a replaceable cartridge unit which can be adjusted in a simple manner at the time of installation so that it is entirely optional as to which of the inlets is connected to the hot water supply pipe and which is connected to the cold water supply pipe.

Other objects and advantages of the invention will become apparent from the following specification, drawings and appended claims.

In the drawings:

FIG. 3 is a front view of the casing indicated in FIG. 1;

FIG. 4 is a sectional view of the casing taken on line 4—4 of FIG. 3;

FIGS. 5 and 6 are front and side views respectively of the cover for the casing shown in FIGS. 3 and 4;

Figure 1:
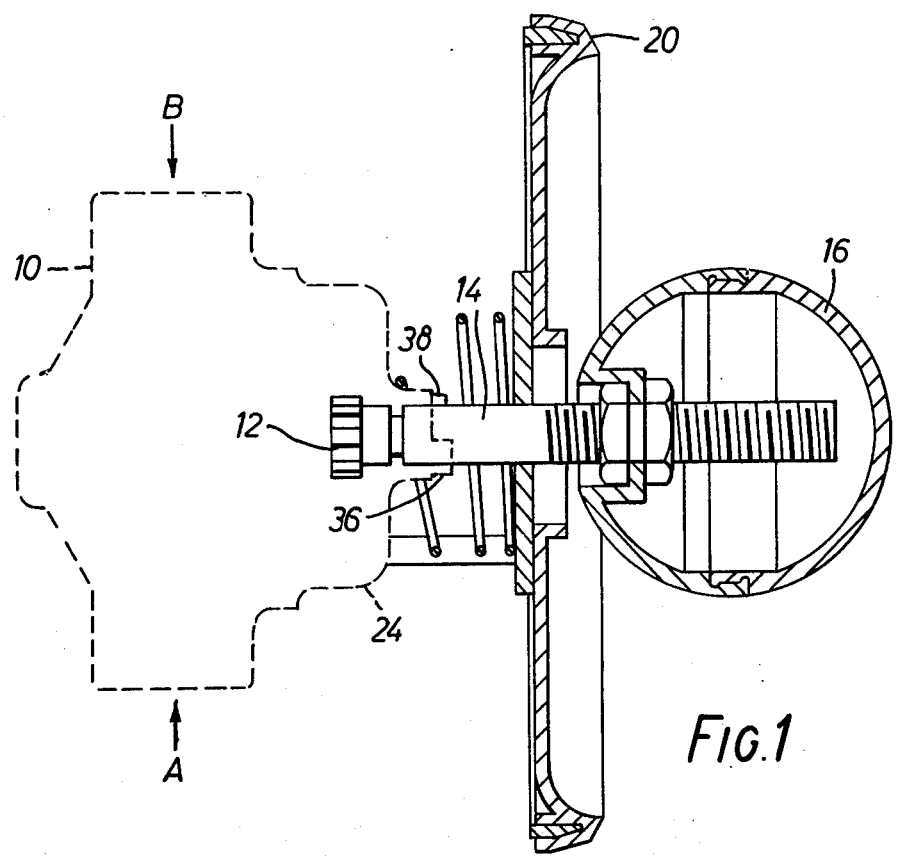
FIG. 1 is a top view of a shower control valve assembly with the control knob and associated parts being shown in section and the outline of the casing in which a valve cartridge is insertable is indicated with a broken line.

Referring to FIG. 1 of the drawings, there is shown the top view of the shower control valve assembly which includes the outline of a casing 10 into which a replaceable cartridge is insertable. The cartridge, which is not shown in FIG. 1, contains seals, springs and a throttle disk in accordance with the invention.

Figure 2:
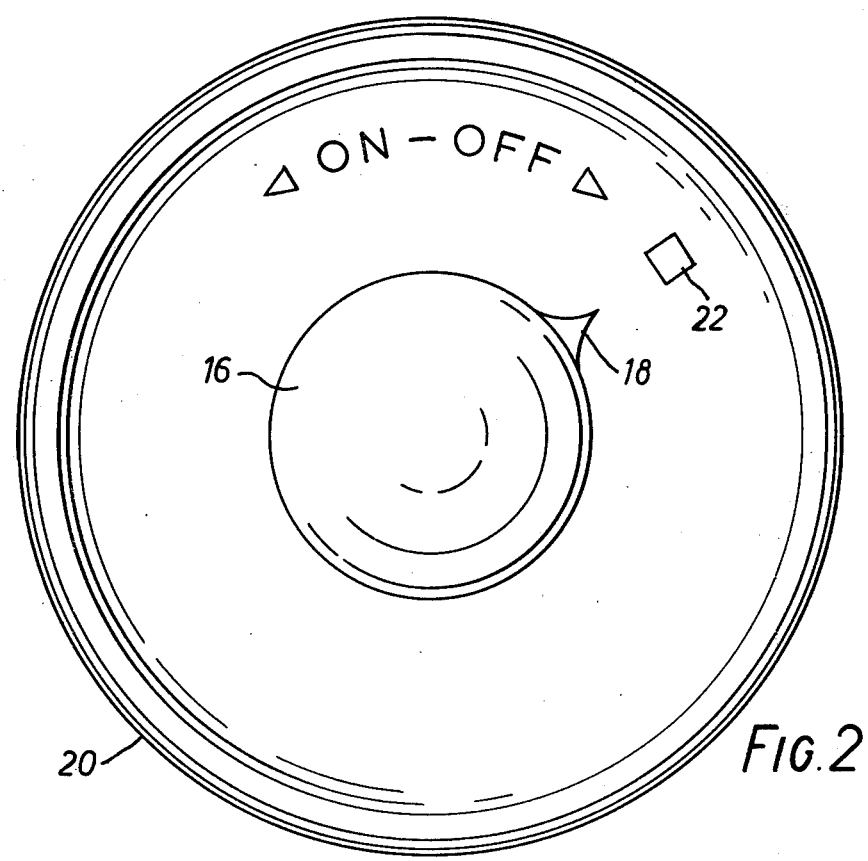
FIG. 2 is a front view of the assembly shown in FIG. 1.

With reference to FIGS. 1 and 2, the casing 10 is normally mounted between the studs of a bathroom wall and, in the case of back to back installations in which there is a shower stall on each side of a wall, the hot and cold water supply pipe indicated by the letters A and B may be interchanged. A simple selectable setting of the valve disk of the cartridge (not shown in FIGS. 1 and 2) at the time of installation will permit the supply A to be either hot or cold with the other supply B being the opposite temperature.

The valve disk of the cartridge is operated by a pinion 12 which is connected to a shaft 14. Shaft 14 has a knob 16 at the outer end thereof which has a position indicator 18.

An escutcheon 20 which is attachable to a shower compartment wall indicates the ON and OFF rotational directions and has an index marking 22 which, when aligned with the knob indicator 18, shows the OFF position.

FIGS. 3 and 4 show the casing 10 while FIGS. 5 and 6 show the front cover 24 of the casing. Casing 10 has a generally cylindrical shape and has optionally reversible hot and cold inlets 26 and 28 on opposite sides thereof and a discharge outlet 30 at the top thereof. A vertically extending recess 32 at the rear of the casing 10 receives and accommodates a replaceable cartridge unit.

The casing cover 24 shown in FIGS. 5 and 6 is cup shaped and is attachable with screw means to the casing 10. A hub portion 34 defines a hole for accommodating the control shaft 14. An axially extending lug 36 on the hub occupies about 90° of the lower left hand quadrant thereof. The lug 36 functions as a stop for an indexing pin 38 which extends radially from shaft 14. With this construction it is apparent that the knob 16 is rotatable through an arc of about 270° which is the angular displacement of shaft pin 38 permitted by hub lug 36.

Figure 7:
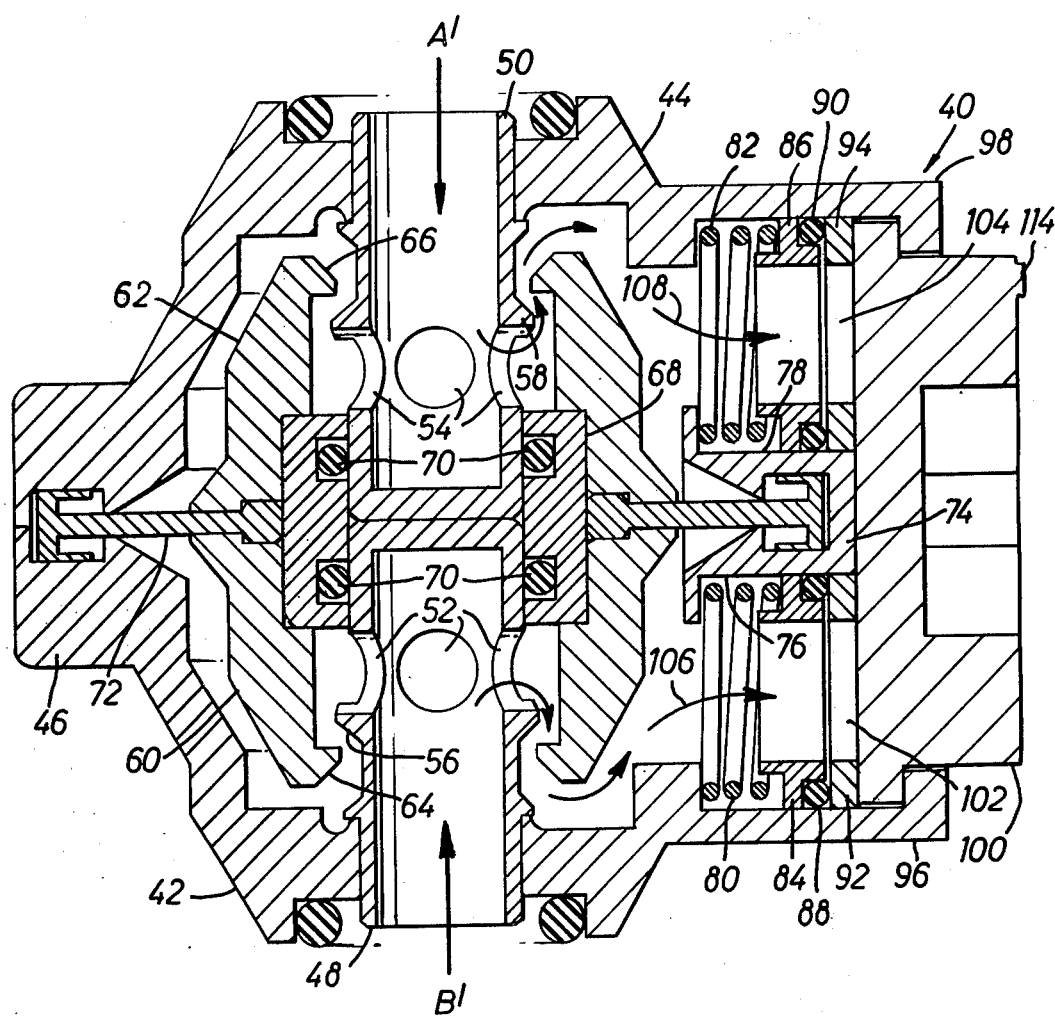
FIG. 7 is a sectional plan view of a replaceable cartridge unit embodying the invention which is insertable into the casing shown in FIGS. 1 to 6.

FIG. 7 is a view from the top of a replaceable cartridge unit 40 which is insertable into the casing 10. The cartridge has a shell which comprises two halves 42 and 44 which are joined with screw means which are not shown. The cartridge shell has a vertically and generally rectangularly shaped protuberance 46 which is the same nominal size as the casing recess 32 and is received by the recess when the cartridge 40 is inserted into the casing 10.

Cartridge 40 is generally symmetrical relative to a central vertical plane. The letters A' and B' in FIG. 7 correspond to the letters A and B of FIG. 1 and represent hot and cold water inlets with either one being the hot water inlet and the other being the cold water inlet. The inlets A' and B' of the cartridge 40 are, when the cartridge is inserted, aligned with the casing inlets 26 and 28.

Tube sections 48 and 50, having closed bottom portions, are aligned with casing inlets 26 and 28 and are fixedly attached to the shell sections 42 and 44. The tube sections have egress holes 52 and 54 and, radially outwardly from these holes, are collar portions 56 and 58 which constitute fixed seats of a throttle valve unit.

The throttle valve unit referred to and described herein functions to maintain substantially constant shower outlet temperatures by compensating for relative changes in pressure of the hot and cold water supplied to the unit. This throttling feature is in the prior art and no claim for it is made herein.

The movable part of the throttle valve unit which cooperates with the fixed seats to provide the throttling function are connected tube sections 60 and 62 which surround tube sections 48 and 50. The outer tube sections 60 and 62 have lip portions 64 and 66 which cooperate with the fixed seats 54 and 56 in a manner to throttle the flows of water egressing from the holes 52 and 54. The axial movement of the movable unit which comprises the tube sections 60 and 62 is such that an increase in the throttling of water flowing out of holes 52 is accompanied by a decrease in the throttling of water flowing out of holes 54, and vice versa.

The tube sections 60 and 62 are rigidly connected with a ring shaped coupling bearing 68 onto which the tube sections are press fitted. The inside diameter of coupling 68 is nominally the same as the outside diameters of tube sections 48 and 50 and a slip fit is provided therebetween which permits coupling 68 to move relative to the tube sections 48 and 50. O-rings 70 provide fluid sealing between the coupling and the tube sections.

The throttle valve unit also includes an annularly shaped diaphragm 72 made of a resilient material which has its outer periphery fixedly attached between the cartridge shell halves 42 and 44. Tube sections 60 and 62 are spaced from each other and the inner periphery of the diaphragm 72 is fixedly attached between the tube section and is moveable therewith.

In operation an increase in pressure on one side, such as in the tube 48, reacts on diaphragm 72 to move tube sections 60 and 62 in a direction such that an increase in throttling occurs between valve parts 56 and 64 and a decrease in throttling occurs between the opposite valve parts 58 and 66.

Figure 10:
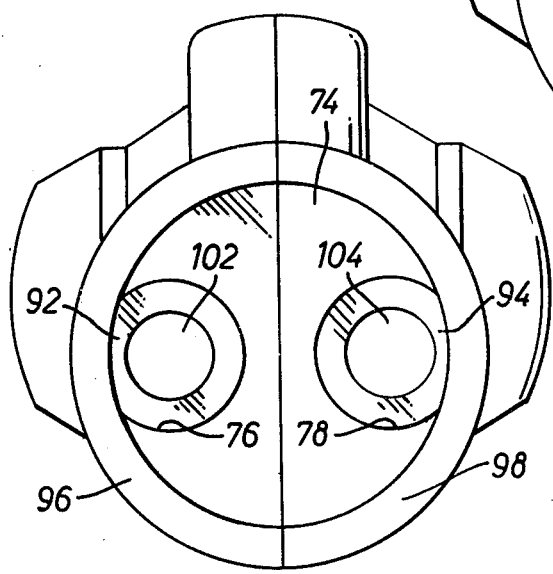

Referring to the right side of FIG. 7 and to FIG. 10, the shell halves 42 and 44 are molded to form a wall member 74 with two cylindrically shaped recesses 76 and 78 having the shape of counterbores to facilitate the flow of a liquid therethrough and retaining therein of coil springs 80 and 82. Ring shaped glands 84 and 86, associated O-rings 88 and 90, and plastic washers 92 and 94 are also respectively disposed in the recesses 76 and 78.

Extending to the right of cartridge wall portion 74 are casing portions 96 and 98 which form a ring. Within this ring, and in abutting engagement with the wall portion 74, is a disk valve 100. At this point it is helpful to take note that FIGS. 8 and 9 include the disk 100 whereas FIG. 10 omits the disk in order to show the wall member 74 and especially the openings or ports 102 and 104 defined by the inside diameters of the washers 94 and 96.

Figure 8:
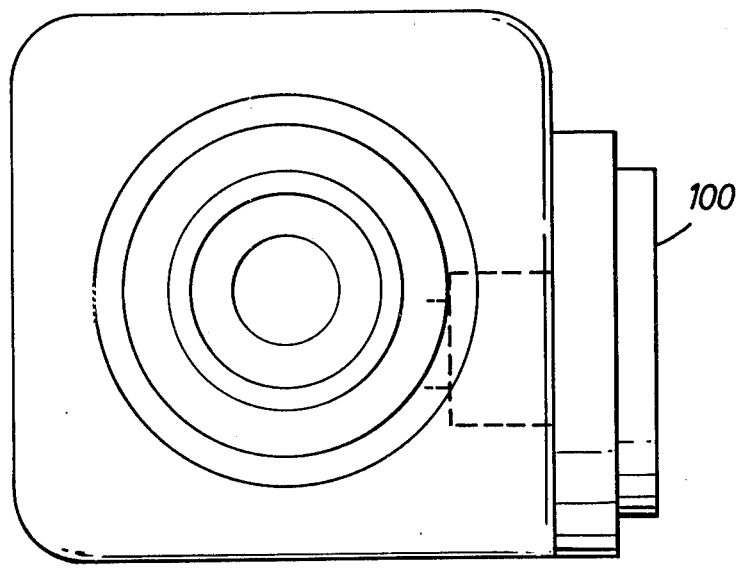
FIG. 8 is a side view of the cartridge shown in FIG. 7.
Figure 9:
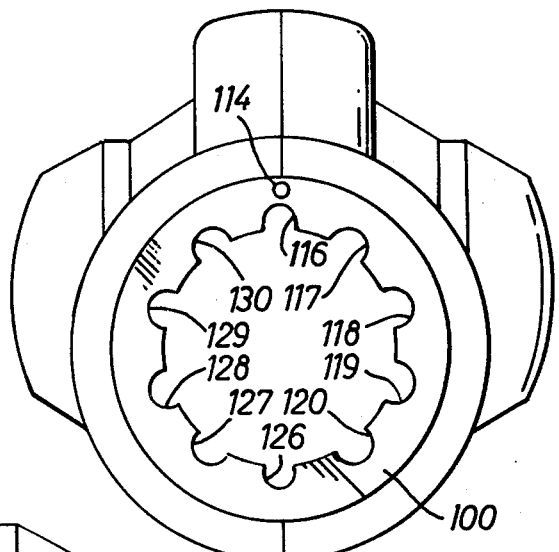
FIGS. 9 and 10 are front views of the cartridge shown in FIG. 7 with the control disk being respectively present and absent in these views.

After the cartridge as shown in FIGS. 8 or 9 is installed in the casing 10 as shown in FIGS. 3 and 4, the pinion shaft 14 is put through the hole of the cover hub 34 and the cover 24 is fastened to the casing 10. With reference to FIG. 7, the structure described forms two inlet chambers separated by the diaphragm 72 which chambers are conveniently identified by the arrows 106 and 108. Wall portion 74 constitutes wall means for the inlet chambers which outlets are controlled by the disk valve 100. Disk valve 100 has two ports 110 and 112 which control the flow of water from the inlet chambers 106 and 108 through the valve disk to a discharge chamber 113 (see FIG. 6) formed to the right of the disk valve by the interior of cover 24 which has fluid communication with the discharge outlet 30 of the casing 10.

The disk valve 100 is shown in FIGS. 7, 8, 9, 11, 12 and 13. The disk has valving ports 110 and 112 on the side thereof which abuts cartridge wall 74 and two sets of internal teeth on the other side which are engageable by the pinion 12. Disk 100 has two indexed starting positions which are (1) the position shown in FIG. 11 with the index marker 114 in the up position and (2) a position displaced 180 degrees with the marker 114 in a down position.

It is more convenient to discuss the two sets of gear teeth of the disk by referring to the tooth spacings. In this respect the first set is represented by the five spacings 116 to 120 and the second set by the five spacings 126 to 130. Pinion 12 has five teeth 136 to 140 which cooperate with either the first set or the second set of disk teeth depending on the initial position of the disk marker 114. As an aid to the indexing of the unit, pinion tooth 136 is smaller than the other teeth and this corresponds to smaller spacings 116 and 126 of the two sets of disk teeth.

In explaining the operation of the unit described, it will first be assumed that the plumber has connected the hot water supply line to casing inlet 26 and the cold water line to casing inlet 28. With this connection the hot water would enter cartridge tube 48 and travel through the chamber 106 to the outlet port 102. With reference to FIG. 10, if the hot water outlet is opening 102, the opening 104 is the cold water outlet.

Figure 11:
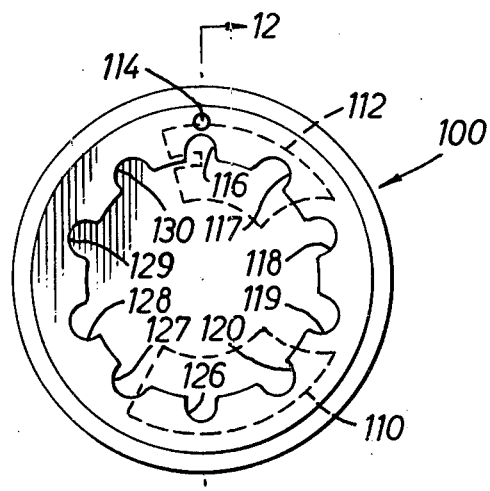
FIGS. 11 and 12 are front and sectional views respectively of the control disk with the latter being taken on line 12—12 of FIG. 11.
Figure 12:
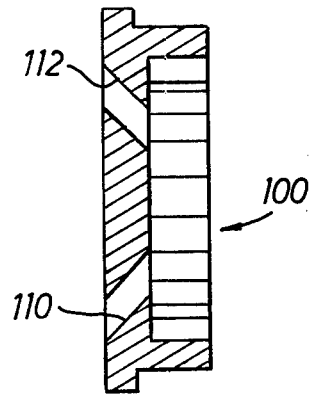
Figure 13:
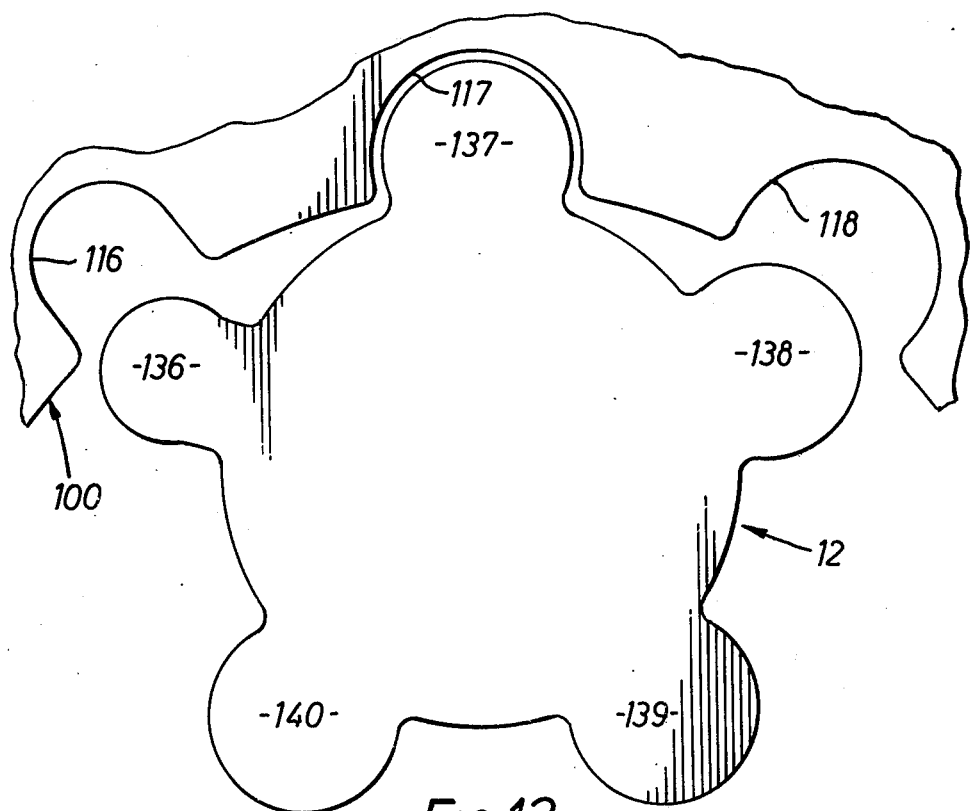
FIG. 13 is an enlarged fragmentary view showing the meshing of the pinion with the internal teeth of the control disk.

The valve disk 100 is set in an initial position as shown in FIG. 11 with both the marker 114 and the small gear spacing 116 in the 12 o'clock positions. Pinion 12 is installed so that the smallest tooth 136 thereof is in the space 116 and, with reference to FIG. 2, the knob indicator 18 is aligned with the "OFF" index marker 22 on the escutcheon 20. This position is established by the pin 38 of shaft 14 abutting the lug 36 of the casing hub portion 34.

The disk ports 110 and 112, which are not necessarily the same size and shape as each other and which do not provide a symmetrical valve face, are sized and arranged so that as the knob 16 is turned to the left, the disk port 110 starts to intersect the cold water outlet 104 immediately thereafter. In this design the disk is rotatable through an arc of about 150° as determined by the lug 36 of the casing hub portion 34. In general, during the first 37 degrees of rotation of the disk the port 110 thereof overlaps the cold water outlet 104 and port 112 has not yet reached the hot water outlet 102. During the next 93 degrees of rotation of disk 100 port 110 is in overlapping relation relative to the cold water outlet 104 and port 112 is in overlapping relation to the hot water outlet 102. During the last 20° of rotation the disk port 112 is in overlapping relation to hot water outlet 102 but disk port 110 has passed entirely beyond cold water outlet 104. It will be apparent that the beginning and ending travel of the disk 100 causes only cold and only hot water, respectively, to be discharged from the casing outlet 30 but during the middle part of its travel there is a transition during which the ratio of hot water gradually increases from 0 to 100 percent.

During the above described operation, the disk 100 rotates through an arc of about 150° and the pinion 12 rotates through an arc of about 300°, the pinion teeth engage only one set of disk teeth which is represented by the recesses 116 to 120. The turning of the knob through a full 300° represents a 2 to 1 gear ratio which permits a very fine degree of adjustment for the knob 16 in dialing in the desired water temperature.

If a back-to-back shower arrangement is encountered the option is open to the plumber to connect the hot water supply line to the casing inlet 28 instead of inlet 26 as described above. In that case the hot water would enter cartridge tube 50 and travel through the chamber 108 to the outlet port 104. With reference to FIG. 10, if the hot water outlet is opening 104, the opening 102 becomes the cold water outlet.

For this arrangement the valve disk 100 is set in an initial position as shown in FIG. 11 with the marker 114 in the 6 o'clock position and the small gear spacing 126 in the 12 o'clock position. Pinion 12 is installed so that the smallest tooth 136 thereof is in the space 126 and, with reference to FIG. 2 the knob indicator 18 is, as in the other case, aligned with the OFF index marker 22 on the escutcheon 20 as established by the shaft pin 38 abutting the hub portion lug 36. As the knob 16 is turned to the left, the disk port 110 starts to intersect the changed cold water outlet 102 immediately thereafter. The disk is again rotatable through an arc of about 150° as determined by the lug 36 of the casing hub portion 34.

The sequential operation whereby cold, mixed temperature and hot water are discharged as the knob is turned to the left is exactly the same as for the first described mode of connecting the hot and cold water supply pipes to the unit.

Aside from the geometry of the valve openings, a practical effect and advantage of the gear arrangement disclosed relates to the temperature control zone which is utilized by and of interest to the user. This control zone is from about 95° to 100° F. and is covered by rotating the knob 16 with fine control through a rotation range of about 45°. In prior art units this critical zone is traversed by a rotation of only about 12° and this of course is too coarse an adjustment for obtaining precision settings which provide the greatest comfort and enjoyment.

I claim:

1. A shower control valve assembly comprising a casing having optionally reversible hot and cold inlets on opposite sides thereof and an outlet on the top side thereof, a cartridge shell insertable in said casing having first and second separate inlet chambers in respective fluid communication with said casing inlets, wall means for said chambers having first and second valve openings for said first and second chambers, a mixing valve disk rotatably mounted in said cartridge in abutting engagement with said wall means, said casing having a discharge chamber on the side of said disk away from said inlet chambers, said disk having first and second indexed starting positions displaced 180° from each other, said disk having first and second ports cooperable with said valve openings when starting from said first position to sequentially draw (1) cold (2) mixed temperature and (3) hot water from said inlet chambers to said discharge chamber when said first chamber contains hot water, said first and second disk ports being cooperable with said valve openings when starting from said second position to sequentially draw (1) cold (2) mixed temperature and (3) hot water from said inlet chambers to said discharge chamber when said second chamber contains hot water, said valve disk having internal teeth forming a ring gear, a pinion gear engaging said ring gear, and a shaft attached to said pinion gear and extending through said casing.

2. A shower control valve assembly according to claim 1 wherein said ring gear has two indexing recesses of a unique size displaced 180° apart, said pinion gear having one indexing tooth of unique size equal to the size of said recesses.

3. A shower control valve assembly according to claim 2 wherein said pinion shaft has an indexed starting position, said disk being in one of its indexed starting positions when said indexing pinion tooth is in mesh with one of said indexing recesses and said pinion shaft is in its indexed starting position.

4. A shower control valve assembly according to claim 1 wherein the ratio between said ring and pinion gears is 2:1.

* * * * *